US008466771B2

(12) United States Patent
Fujita et al.

(10) Patent No.: US 8,466,771 B2
(45) Date of Patent: Jun. 18, 2013

(54) SINTERED METAL OXIDE FOR THERMISTOR, THERMISTOR ELEMENT, THERMISTOR TEMPERATURE SENSOR, AND METHOD FOR PRODUCING SINTERED METAL OXIDE FOR THERMISTOR

(75) Inventors: Toshiaki Fujita, Naka (JP); Kazutaka Fujiwara, Naka (JP); Takashi Yamaguchi, Naka (JP)

(73) Assignee: Mitsubishi Materials Corporation, Tokyo (JP)

( * ) Notice: Subject to any disclaimer, the term of this patent is extended or adjusted under 35 U.S.C. 154(b) by 0 days.

(21) Appl. No.: 13/145,262

(22) PCT Filed: Jul. 17, 2009

(86) PCT No.: PCT/JP2009/003371
§ 371 (c)(1),
(2), (4) Date: Jul. 19, 2011

(87) PCT Pub. No.: WO2010/086915
PCT Pub. Date: Aug. 5, 2010

(65) Prior Publication Data
US 2011/0273265 A1 Nov. 10, 2011

(30) Foreign Application Priority Data
Jan. 30, 2009 (JP) ................... 2009-019547

(51) Int. Cl.
*H01C 7/10* (2006.01)
(52) U.S. Cl.
USPC ................... 338/22 SD; 338/22 R (58) Field of Classification Search
USPC ............................. 338/22 R, 22 SD
See application file for complete search history.

(56) References Cited

U.S. PATENT DOCUMENTS

| | | | | |
|---|---|---|---|---|
| 4,891,158 A | * | 1/1990 | Hata | 252/518.1 |
| 5,694,107 A | * | 12/1997 | Moriwake et al. | 338/22 R |
| 5,720,859 A | * | 2/1998 | Czubarow et al. | 204/157.43 |
| 6,143,207 A | * | 11/2000 | Yamada et al. | 252/515 |
| 6,306,315 B1 | * | 10/2001 | Ogata et al. | 252/518.1 |
| 6,740,261 B1 | * | 5/2004 | Ogata et al. | 252/520.5 |
| 7,056,453 B2 | * | 6/2006 | Ogata et al. | 252/518.1 |
| 7,656,269 B2 | * | 2/2010 | Mizoguchi et al. | 338/22 R |

FOREIGN PATENT DOCUMENTS
| | | |
|---|---|---|
| JP | 2000-100606 A | 4/2000 |
| JP | 2002-57003 A | 2/2002 |

OTHER PUBLICATIONS

JP6316457 English Abstract. Heat Generating Element Made of Ceramic. Nov. 1994.*
EP0974983 Thermistor. English machine translation of Specification. Apr. 2000.*
EP0974983 Thermistor. English machine translation of Claims. Apr. 2000.*

(Continued)

*Primary Examiner* — Kyung Lee
(74) *Attorney, Agent, or Firm* — Edwards, Wildman, Palmer, LLP; Jeffrey D. Hsi (57) ABSTRACT

Disclosed is a sintered metal oxide used for thermistors, which includes a complex oxide represented by the following general formula: $La_{1-y}A_y(Cr_{1-x}Mn_x)O_3$ (with the proviso that A represents at least either one of Ca or Sr, and x and y satisfy $0.0 \leq x \leq 1.0$ and $0.0 < y \leq 0.7$). Also disclosed is a thermistor element (3) that includes a sintered metal oxide for thermistors (2) and at least a pair of lead wires (1) each having an end affixed to the sintered metal oxide for thermistors (2).

21 Claims, 4 Drawing Sheets

OTHER PUBLICATIONS

International Search Report dated Oct. 19, 2009, corresponding to PCT/JP2009/003371.

Notice of Refusal issued in Chinese Patent Application No. 200980155791.2.

* cited by examiner

SINTERED METAL OXIDE FOR THERMISTOR, THERMISTOR ELEMENT, THERMISTOR TEMPERATURE SENSOR, AND METHOD FOR PRODUCING SINTERED METAL OXIDE FOR THERMISTOR

CROSS-REFERENCE TO RELATED APPLICATIONS

This application is the national phase under 35 U.S.C. §371 of PCT International Application No.: PCT/JP2009/003371, filed Jul. 17, 2009, which claims priority of Japanese Application No.: 2009-019547, filed on Jan. 30, 2009. The contents of each of these applications are incorporated herein by reference in their entirety.

BACKGROUND OF THE INVENTION

1. Field of the Invention

The present invention relates to a sintered metal oxide for thermistors used for, for example, temperature measurement of automobiles, a thermistor element, a thermistor temperature sensor, and a method for producing a sintered metal oxide for thermistors.

2. Description of the Related Art

In general, thermistor temperature sensors are employed as temperature sensors for measuring a catalyst temperature, an exhaust-gas system temperature, or the like around automobile engines. A thermistor element used for the thermistor temperature sensor is employed, for example, as a temperature sensor for the aforementioned automobile-related technologies, information equipment, communication equipment, medical equipment, home facility equipment, and the like. For such a thermistor element, a sintered body element made of an oxide semiconductor having a high negative temperature coefficient is used.

Conventionally, a thermistor element consisting of various sintered metal oxides has been used. As an exemplary representative material, Y(Cr, Mn)O$_3$-type perovskite oxides may be included as disclosed in Patent Documents 1 and 2 and Non-Patent Document 1.

PRIOR ART DOCUMENTS

Patent Documents

[Patent Document 1] Japanese Patent No. 3362651
[Patent Document 2] Japanese Patent No. 3776691

Non-Patent Document

[Non-Patent Document 1] Kurano, "Development of catalyst temperature sensor for controlling NOx catalyst", Denso Technical Review, Vol. 5, No. 2, 2000

SUMMARY OF THE INVENTION

Problems to be solved by the Invention

The following problems still remain in the conventional techniques described above.

A thermistor element that is capable of measuring temperature up to a high temperature of approximately 1100° C. is required for measuring a catalyst temperature or the like around an automobile engine. An important property for such a thermistor for high temperature is that a change in resistance value is small at high temperature. However, the conventional material has a resistance value reduction of about 5% in high-temperature retention test, and thus may not be employed for some applications. In recent years, there has been a demand for a thermistor element that is capable of measuring a wide range of temperature from −40° C. to 1100° C.

The present invention has been made in view of the aforementioned circumstances, and an object of the present invention is to provide a reliable sintered metal oxide for thermistors that is capable of measuring a wide range of temperature as well as has a small change in resistance value at a high temperature of approximately 1100° C., a thermistor element, and a method for producing a sintered metal oxide for thermistors.

Also, the following problems still remain in the conventional techniques described above.

A thermistor element that is capable of measuring temperature up to a high temperature of approximately 1100° C. is required for measuring a catalyst temperature or the like around an automobile engine. An important property for such a thermistor for high temperature is that a change in resistance value is small at high temperature. However, the conventional material has a relatively large reduction in resistance value in high-temperature retention test, and thus may not be employed for some applications.

In addition, since a stainless steel or the like used for a cap member for storing a thermistor element, when the thermistor element is mounted, is readily oxidized at a high temperature, the inner surface of the cap member is oxidized, whereby the oxygen concentration inside the air-tightly sealed cap member is lowered and thus a reduction is caused by taking oxygen from the thermistor element. Consequently, a thermistor property is undesirably unstable.

The present invention has been made in view of the aforementioned circumstances, and an object of the present invention is to provide a reliable sintered metal oxide for thermistors that has a small change in resistance value at a high temperature of approximately 1000° C., a thermistor element, a thermistor temperature sensor, and a method for producing a sintered metal oxide for thermistors.

Means for Solving the Problems

The present inventors have seriously investigated the Cr, Mn-type perovskite oxide (ABO$_3$) and found that the change in resistance value rate differs depending on the A-site element, in particular, the change in resistance value is suppressed using La for the A-site. Furthermore, the present inventors also have found that the change in resistance value at 1100° C. can be further suppressed by substituting La at the A-site with a certain element.

Therefore, the present invention has been made on the basis of the finding, and adopts the following configuration in order to overcome the aforementioned problems.

More specifically, the sintered metal oxide for thermistors of the present invention is a sintered metal oxide used for thermistors, and is characterized in that a complex oxide represented by the following general formula: La$_{1-y}$A$_y$(Cr$_{1-x}$Mn$_x$)O$_3$ (with the proviso that A represents at least either one of Ca or Sr, and x and y satisfy $0.0 \leq x \leq 1.0$ and $0.0 < y \leq 0.7$) is included.

When La is arranged at the A-site as a Cr, Mn-type perovskite oxide, entry and coming out of oxygen are reduced, and thus the change in resistivity can be suppressed. However, when La is used at the A-site and unreacted La$_2$O$_3$ remains in the sintered body, La$_2$O$_3$ has such a property of changing to La(OH)$_3$, i.e., hydroxide thereof, after the sintered body is exposed to an environment containing moisture for a long period of time, which leads to instability. Hence, when La is used at the A-site, unreacted $La_2O_3$ needs not to be remained. However, since both have a different molecular weight, a change in material composition undesirably occurs each time preparation of raw materials is performed. Thus, when preparation of raw materials is performed, it is important that $La_2O_3$ is accurately prepared in the 100% manner.

However, since it is difficult to prepare $La_2O_3$ in 100% accuracy and is difficult for the perovskite oxide to enter an element exceeding 100% at the A-site, $La_2O_3$ may remain in a sintered body.

Accordingly, the sintered metal oxide for thermistors of the present invention includes a complex oxide represented by the general formula: $La_{1-y}A_y(Cr_{1-x}Mn_x)O_3$, with the proviso that A represents at least either one of Ca or Sr, and x and y satisfy $0.0 \leq x \leq 1.0$, $0.0 < y \leq 0.7$. Since a part of La at the A-site is substituted with Ca or Sr, a complex oxide can be obtained with a predetermined reduced amount of La. Furthermore, since Ca or Sr compensates for the decrease of La, an element can be filled the A-site of the perovskite oxide in the 100% manner, whereby the remaining of unreacted $La_2O_3$ in a sintered body can be prevented. This allows the rate of change in resistance value to be suppressed to 1% or lower. By changing the ratio between La and Ca or La and Sr, or the ratio between Cr and Mn, the constant B of the sintered metal oxide for thermistors can be set in the range of 1000 to 4200 K. In particular, the material having the constant B of 2500 K or less has the constant B lower than that of the conventional one, and thus can measure a very wide range of temperature (from −40° C. to approximately 1100° C.).

Once La is incorporated in the perovskite oxide, $La(OH)_3$ is not precipitated thereafter. When La is substituted with 70% or greater of Ca or Sr, the change in resistance value increases, and thus preparation of the perovskite oxide is performed such that the percentage of La deficiency needs to be equal to or less than 70% ($y \leq 0.7$).

Also, the sintered metal oxide for thermistors of the present invention is characterized in that an insulator material is added to the complex oxide.

When La is simply substituted with Ca or Sr, the constant B is lowered as well as the resistance value is reduced. In particular, in the material having a higher concentration of Ca or Sr, the resistance value becomes very small at high temperature, and thus temperature detection accuracy may be undesirably degraded in the high temperature range. However, in the sintered metal oxide for thermistors of the present invention, an insulator material is added to the complex oxide, and thus the resistance value can be increased depending on the amount of the insulator material added.

Furthermore, the sintered metal oxide for thermistors of the present invention is characterized in that at least one of the insulator materials is $ZrO_2$ and a zirconia stabilizing material is further added to the complex oxide.

When $ZrO_2$ is independently employed, a structure phase transition occurs at a temperature from room temperature to 900° C. Thus, when $ZrO_2$ is used as additive material, electrical characteristics may change upon receiving thermal history at the temperature range from room temperature to 900° C. Accordingly, in the sintered metal oxide for thermistors of the present invention, a zirconia stabilizing material is further added to the complex oxide to which $ZrO_2$ has been added, and thus a stable $ZrO_2$ structure may be obtained for thermal history. Consequently, a change in electrical characteristics can be prevented.

In particular, in the sintered metal oxide for thermistors of the present invention, it is preferable that the complex oxide is represented by the general formula: $(1-z)La_{1-y}A_y(Cr_{1-x}Mn_x)O_3+z((1-w)ZrO_2+wM)$, with the proviso that A represents at least either one of Ca or Sr, and x, y, z, and w satisfy $0.0 \leq x \leq 1.0$, $0.0 < y \leq 0.7$, $0.0 < z \leq 0.8$, and $0.0 < w \leq 0.2$, and M represents the zirconia stabilizing material.

More specifically, when the zirconia stabilizing material is added exceeding 20%, such zirconia stabilizing material may affect the heat resistance (an increase (decrease) in the change in resistance value, the occurrence of cracking at the heat cycle test (HCT)). However, in the sintered metal oxide for thermistors of the present invention, the zirconia stabilizing material is set to be mixed within 20%, and thus excellent heat resistance can be obtained.

The thermistor element of the present invention is characterized in that it includes the sintered metal oxide for thermistors of the present invention, and at least a pair of lead wires each having an end affixed to the sintered metal oxide for thermistors. More specifically, the thermistor element can cover a wide temperature range as a single sensor element, which allows a stable temperature measurement with a small change in resistance value even at high temperature.

The method for producing a sintered metal oxide for thermistors of the present invention is a method for producing a sintered metal oxide used for thermistors, and is characterized in that it includes the steps of sintering a mixture comprising powders of $La_2O_3$ and at least either one of $CaCO_3$ or $SrCO_3$, or a mixture comprising powders of the mixture and at least either one of $Cr_2O_3$ or $MnO_2$ to thereby obtain a calcined powder of a complex oxide represented by the general formula: $La_{1-y}A_y(Cr_{1-x}Mn_x)O_3$, with the proviso that A represents at least either one of Ca or Sr, and x and y satisfy $0.0 \leq x \leq 1.0$, and $0.0 < y \leq 0.7$; and molding and sintering the calcined powder to thereby obtain a sintered body. More specifically, in the method for producing a sintered metal oxide for thermistors, a mixture comprising powders of $La_2O_3$ and at least either one of $CaCO_3$ or $SrCO_3$, or a mixture comprising powders of the mixture and at least either one of $Cr_2O_3$ or $MnO_2$ is sintered, the sintered body of the complex oxide, in which a part of La is substituted with Ca or Sr, that is represented by the general formula: $La_{1-y}A_y(Cr_{1-x}Mn_x)O_3$, with the proviso that A represents at least either one of Ca or Sr, and x and y satisfy $0.0 \leq x \leq 1.0$, and $0.0 < y \leq 0.7$ can be obtained.

Also, the method for producing a sintered metal oxide for thermistors of the present invention is characterized in that the $La_2O_3$ is subject to heat treatment at a temperature of 600° C. to 1100° C. in advance and then mixed. More specifically, in the method for producing a sintered metal oxide for thermistors, $La_2O_3$ is subject to heat treatment at a temperature of 600° C. to 1100° C. in advance and then mixed. Thus, the mixture of $La(OH)_3$ mixed in $La_2O_3$ is regenerated into $La_2O_3$ by heating, which prevents $La(OH)_3$, which becomes a factor of instability, from being mixed.

Also, the method for producing a sintered metal oxide for thermistors of the present invention is characterized in that it includes the steps of mixing the calcined powder with insulator material powder to thereby obtain a mixed calcined powder represented by the general formula: $(1-z)La_{1-y}A_y(Cr_{1-x}Mn_x)O_3+zM$, with the proviso that A represents at least either one of Ca or Sr, and x, y and z satisfy $0.0 \leq x \leq 1.0$, $0.0 < y \leq 0.7$, and $0.0 \leq z \leq 0.8$, and M represents the insulator material; molding and sintering the mixed calcined powder to thereby obtain a sintered body. More specifically, in the method for producing a sintered metal oxide for thermistors, the calcined powder is further mixed with the insulator material powder, and thus the resistance value of the sintered body can be increased depending on the amount of the insulator material added.

Furthermore, the method for producing a sintered metal oxide for thermistors of the present invention is characterized in that at least one of the insulator materials is $ZrO_2$, and the method further includes the step of subjecting a heat treatment to the mixed sintered body at a temperature of 900° C. or higher. More specifically, the method for producing a sintered metal oxide for thermistors includes the step of subjecting a heat treatment (annealing treatment) to the mixed sintered body at a temperature of 900° C. or higher, a change in electrical characteristics of $ZrO_2$ caused by a structure phase transition thereof upon thermal history can be suppressed.

The method for producing a sintered metal oxide for thermistors of the present invention is characterized in that at least one of the insulator materials is $ZrO_2$ and the calcined powder is further mixed with a zirconia stabilizing material. More specifically, in the method for producing a sintered metal oxide for thermistors, the calcined powder is further mixed with a zirconia stabilizing material, and thus a stable $ZrO_2$ structure may be obtained for thermal history. Consequently, a change in electrical characteristics can be prevented.

Furthermore, the method for producing a sintered metal oxide for thermistors of the present invention is characterized in that the zirconia stabilizing material is mixed in proportion such that the sintered body is represented by the general formula: $(1-z)La_{1-y}A_y(Cr_{1-x}Mn_x)O_3+z((1-w)ZrO_2+wM)$, with the proviso that A represents at least either one of Ca or Sr, and x, y, z and w satisfy $0.0 \leq x \leq 1.0$, $0.0 < y \leq 0.7$, $0.0 < z \leq 0.8$, and $0.0 < w \leq 0.2$, and M represents the zirconia stabilizing material. More specifically, in the method for producing a sintered metal oxide for thermistors, the zirconia stabilizing material is set to be mixed within 20%, and thus excellent heat resistance can be obtained.

Furthermore, the present inventors have seriously investigated the Cr, Mn-type perovskite oxide ($ABO_3$) and found that the change in resistance value rate differs depending on the A-site element, in particular, the change in resistance value is suppressed using La at the A-site. Furthermore, the present inventors also have found that the change in resistance value at approximately 1000° C. can be further suppressed by substituting La at the A-site with a certain element. Furthermore, the present inventors also have found that in the insulator material, for example, a sintered perovskite-type oxide mixed with $Y_2O_3$, an insulating layer is deposited on the surface thereof, and thus a reduction caused by taking oxygen from the complex oxide sintered body portion is suppressed, whereby the change in resistance value can be suppressed.

Therefore, the present invention has been made on the basis of the finding, and adopts the following configuration in order to overcome the aforementioned problems.

More specifically, the sintered metal oxide for thermistors of the present invention is a sintered metal oxide used for thermistors and is characterized in that it further includes a complex oxide represented by the general formula: $(La_{1-y}Y_y)_{1-z}A_z(Cr_{1-x}Mn_x)O_3$, with the proviso that A represents at least either one of Ca or Sr, and x, y, and z satisfy $0.0 \leq x \leq 1.0$, $0.0 < y < 1.0$, and $0.0 < z \leq 0.7$.

Also, the method for producing a sintered metal oxide for thermistors of the present invention is a method for producing a sintered metal oxide used for thermistors, and is characterized in that it includes the steps of mixing and sintering a mixture comprising powders of $La_2O_3$, $Y_2O_3$, $ACO_3$, $Cr_2O_3$, and $MnO_2$ to thereby obtain a calcined powder of a complex oxide represented by the general formula: $(La_{1-y}Y_y)_{1-z}A_z(Cr_{1-x}Mn_x)O_3$, with the proviso that A represents at least either one of Ca or Sr, and x, y and z satisfy $0.0 \leq x \leq 1.0$, $0.0 < y < 1.0$, and $0.0 < z \leq 0.7$; and molding and sintering the calcined powder to thereby obtain a sintered body.

Also, the method for producing a sintered metal oxide for thermistors of the present invention is characterized in that the $La_2O_3$ is subject to heat treatment at a temperature of 600° C. to 1100° C. in advance and then mixed. More specifically, in the method for producing a sintered metal oxide for thermistors, $La_2O_3$ is subject to heat treatment at a temperature of 600° C. to 1100° C. in advance and then mixed. Thus, the mixture of $La(OH)_3$ mixed in $La_2O_3$ is regenerated into $La_2O_3$ by heating, which prevents $La(OH)_3$, which becomes a factor of instability, from being mixed.

When La is arranged at the A-site as a Cr, Mn-type perovskite oxide, entry and coming out of oxygen are reduced, and thus the change in resistivity can be suppressed. However, when La is used at the A-site and unreacted $La_2O_3$ remains in the sintered body, $La_2O_3$ has such a property of changing to $La(OH)_3$, i.e., hydroxide thereof, after the sintered body is exposed to an environment containing moisture for a long period of time, which leads to instability. Hence, when La is used at the A-site, unreacted $La_2O_3$ needs not to be remained. However, since both have a different molecular weight, a change in material composition undesirably occurs each time preparation of raw materials is performed. Thus, when preparation of raw materials is performed, it is important that $La_2O_3$ is accurately prepared in the 100% manner.

However, since it is difficult to prepare $La_2O_3$ in 100% accuracy and is difficult for the perovskite oxide to enter an element exceeding 100% at the A-site, $La_2O_3$ may remain in a sintered body.

Accordingly, the calcined powder obtained from the sintered metal oxide for thermistors of the present invention and its producing method includes a complex oxide represented by the general formula: $(La_{1-y}Y_y)_{1-z}A_z(Cr_{1-x}Mn_x)O_3$, with the proviso that A represents at least either one of Ca or Sr, and x, y and z satisfy $0.0 \leq x \leq 1.0$, $0.0 < y \leq 1.0$, and $0.0 < z \leq 0.7$. Since a part of La at the A-site is substituted with Y, Ca or Sr, a complex oxide with a predetermined reduced amount of La can be obtained. Furthermore, an element can be filled the A-site of the perovskite oxide in the 100% manner, whereby the remaining of unreacted $La_2O_3$ in a sintered body can be prevented. This allows for the rate of change in resistance value to be suppressed to 2% or lower. When the proportion of Ca or Sr is increased, the rate of change in resistance value can be further suppressed to 1% or lower. By changing the ratio between (Y, La) and Ca or the ratio between (Y, La) and Sr, the constant B of the sintered metal oxide for thermistors can be the range of 1000 to 4200 K. In particular, the material having the constant B of 2500 K or less has the constant B lower than that of the conventional one, and thus can measure a very wide range of temperature (from −40° C. to approximately 1100° C.).

Although the constant B can be changed by changing the ratio between Cr and Mn, the change in resistance value at 1000° C. increases at the same time, resulting in degradation in heat resistance. However, in the present invention, the constant B can be lowered and at the same time excellent heat resistance can be realized at 1000° C. by adding Ca or Sr.

Once La is incorporated in the perovskite oxide, $La(OH)_3$ is not precipitated thereafter. When La is substituted with 70% or greater of Ca or Sr, the change in resistance value increases, and thus preparation of the perovskite oxide is required such that the percentage of La deficiency is equal to or less than 70% ($z \leq 0.7$).

Also, the sintered metal oxide for thermistors of the present invention is characterized in that an insulator material is added to the complex oxide.

When (Y, La) is simply substituted with Ca or Sr, the constant B is lowered as well as the resistance value is reduced. In particular, in the material having a higher concentration of Ca or Sr, the resistance value becomes very small at high temperature, and thus temperature detection accuracy may be undesirably degraded in the high temperature range. However, in the sintered metal oxide for thermistors of the present invention, an insulator material is added to the complex oxide, and thus the resistance value can be increased depending on the amount of the insulator material added. More specifically, the added insulator material allows the electrical conduction pass to be reduced, and thus the resistance value can be increased. Hence, the resistance value can be adjusted by adjusting the amount of insulator material added.

As an insulator material, $Y_2O_3$, MgO, $CeO_2$, $ZrO_2$, $Al_2O_3$, or the like can be employed.

The sintered metal oxide for thermistors of the present invention is characterized in that it includes a complex oxide represented by the general formula: $1-w(La_{1-y}Y_y)_{1-z}A_z(Cr_{1-x}Mn_x)O_3+wY_2O_3$, with the proviso that A represents at least either one of Ca or Sr, and x, y, z and w satisfy $0.0 \leq x \leq 1.0$, $0.0 < y < 1.0$, $0.0 < z \leq 0.7$, and $0.0 < w \leq 0.8$.

The method for producing a sintered metal oxide for thermistors of the present invention is characterized in that it further includes the steps of mixing the calcined powder with the powder of $Y_2O_3$ to thereby obtain a mixture containing a calcined powder represented by the general formula: $1-w(La_{1-y}Y_y)_{1-z}A_z(Cr_{1-x}Mn_x)O_3+wY_2O_3$, with the proviso that A represents at least either one of Ca or Sr, and x, y, z and w satisfy $0.0 \leq x \leq 1.0$, $0.0 < y < 1.0$, $0.0 < z \leq 0.7$, and $0.0 < w \leq 0.8$, wherein the sintering step molds and sinters the mixture.

More specifically, in these sintered metal oxides for thermistors and the products obtained by the method for producing the same, a complex oxide represented by the general formula: $1-w(La_{1-y}Y_y)_{1-z}A_z(Cr_{1-x}Mn_x)O_3+wY_2O_3$, (with the proviso that A represents at least either one of Ca or Sr, and x, y, z, and w satisfy $0.0 \leq x \leq 1.0$, $0.0 < y < 1.0$, $0.0 < z \leq 0.7$, and $0.0 < w \leq 0.8$), is included, and thus high resistance can be readily achieved depending on the addition of $Y_2O_3$.

Furthermore, an $Y_2O_3$ film is deposited on the surface of a thermistor upon sintering, and thus a reduction caused by taking oxygen from the complex oxide sintered body is suppressed by the $Y_2O_3$ film surface, whereby the change in resistance value can be suppressed. Thus, heat resistance and reduction resistance are realized.

Also, since a perovskite oxide contains Y, sintering is facilitated upon sintering the perovskite oxide mixed with $Y_2O_3$, and thus a high-density molding may be produced. Furthermore, $Y_2O_3$ film deposition is facilitated, and thus high heat resistance and high reduction resistance are realized.

More specifically, incorporating all the elements of La, Y, and Ca or Sr into a perovskite oxide allows the perovskite oxide to have the constant B at a low level and measure a wide range of temperature. In addition, high heat resistance and high reduction resistance are realized.

Furthermore, the method for producing a sintered metal oxide for thermistors of the present invention is characterized in that in the sintering step, at least either one of $CaCO_3$ or $SrCO_3$ is added as a sintering aid to the calcined powder or a mixture containing the calcined powder.

More specifically, in the method for producing a sintered metal oxide for thermistors, $CaCO_3$ or $SrCO_3$ as a sintering aid is added to a perovskite oxide containing Ca or Sr upon sintering, whereby sintering is further facilitated and thus a higher-density molding may be produced.

The thermistor element of the present invention is characterized in that it includes the sintered metal oxide for thermistors of the present invention; and at least a pair of lead wires each having an end affixed to the sintered metal oxide for thermistors. More specifically, the thermistor element can cover a wide temperature range as a single sensor element, which allows a stable temperature measurement with a small change in resistance value even at high temperature of approximately 1000° C.

The thermistor temperature sensor of the present invention is characterized in that it includes the thermistor element of the present invention. More specifically, since the thermistor temperature sensor includes the thermistor element of the present invention, the thermistor element has small change over time at high temperatures and has sufficient measurement accuracy over a wide range from low to high temperatures. Therefore, the thermistor temperature sensor is especially suitable as a sensor for high temperature measurements that detects a catalyst temperature, an exhaust-gas system temperature, or the like around automobile engines.

Effects of the Invention

According to the present invention, the following effects may be provided.

More specifically, according to the sintered metal oxide for thermistors of the present invention and the method for producing the sintered metal oxide for thermistors, a complex oxide represented by the general formula: $La_{1-y}A_y(Cr_{1-x}Mn_x)O_3$ (with the proviso that A represents at least either one of Ca or Sr, and x and y satisfy $0.0 \leq x \leq 1.0$ and $0.0 < y \leq 0.7$) is included. Thus, by entering an element into the A-site of the complex oxide in the 100% manner by substituting a part of La at the A-site with Ca or Sr, the remaining of unreacted $La_2O_3$ in a sintered body can be prevented. This allows for the rate of change in resistance value to be suppressed to 1% or lower. Hence, the thermistor element of the present invention has small change over time at high temperatures and has sufficient measurement accuracy over a wide range from low to high temperatures. Therefore, the thermistor element of the present invention is especially suitable as a sensor for high temperature measurements that detects a catalyst temperature, an exhaust-gas system temperature, or the like around automobile engines.

According to the present invention, the following effects may be provided.

More specifically, according to the sintered metal oxide for thermistors of the present invention and the method for producing the sintered metal oxide for thermistors, a complex oxide represented by the general formula: $(La_{1-y}Y_y)_{1-z}A_z(Cr_{1-x}Mn_x)O_3$ (with the proviso that A represents at least either one of Ca or Sr, and x, y, and z satisfy $0.0 \leq x \leq 1.0$, $0.0 < y < 1.0$, and $0.0 < z \leq 0.7$) is included. Thus, by entering an element into the A-site of the complex oxide in the 100% manner by substituting a part of (Y, La) at the A-site with Ca or Sr, the remaining of unreacted $La_2O_3$ in a sintered body can be prevented. This allows for the rate of change in resistance value to be suppressed to 2% or lower. When the ratio of Ca or Sr is increased, the rate of change in resistance value can be further suppressed to 1% or lower. At the same time, the constant B is lowered and thus a wide range of temperature can be measured. Furthermore, by incorporating Y into a perovskite oxide, not only the resistance value is raised upon sintering the perovskite oxide mixed with the insulator material $Y_2O_3$, but also a reduction caused by taking oxygen from the complex oxide sintered body portion is suppressed by the $Y_2O_3$ layer surface because the $Y_2O_3$ layer is formed on the surface of complex oxide sintered body portion, whereby the change in resistance value can be suppressed. Thus, excellent heat resistance and reduction resistance can be obtained.

Hence, the thermistor element of the present invention has small change over time at high temperatures and has sufficient measurement accuracy over a wide range from low to high temperatures. Therefore, the thermistor element of the present invention is especially suitable as a sensor for high temperature measurements that detects a catalyst temperature, an exhaust-gas system temperature, or the like around automobile engines.

DESCRIPTION OF THE EMBODIMENTS

First Embodiment

Figure 1:
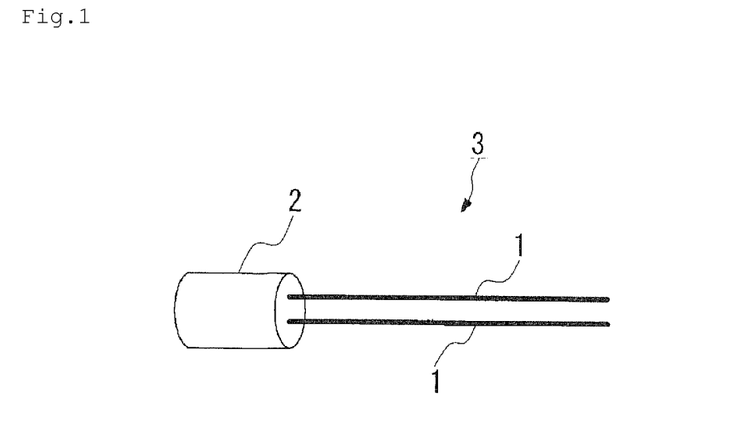
FIG. 1 is a perspective view illustrating a thermistor element in one embodiment of a sintered metal oxide for thermistors, a thermistor element, and a method for producing a sintered metal oxide for thermistors of the present invention.

Hereinafter, one embodiment of a sintered metal oxide for thermistors, a thermistor element, and a method for producing a sintered metal oxide for thermistors of the present invention will be described with reference to FIGS. 1 to 3.

The sintered metal oxide for thermistors of the present embodiment is a sintered metal oxide used for thermistors, and is constituted by a sintered body including a complex oxide represented by the general formula: $La_{1-y}A_y(Cr_{1-x}Mn_x)O_3$, with the proviso that A represents at least either one of Ca or Sr, and x and y satisfy $0.0 \leq x \leq 1.0$ and $0.0 < y \leq 0.7$.

Also, in the sintered metal oxide for thermistors, an insulator material is added to the complex oxide. In particular, it is preferable that at least one of the insulator materials is $ZrO_2$ and a zirconia stabilizing material is further added to the complex oxide.

More specifically, the complex oxide is set to the one as represented by the general formula: $(1-z)La_{1-y}A_y(Cr_{1-x}Mn_x)O_3+z((1-w)ZrO_2+wM)$, with the proviso that A represents at least either one of Ca or Sr, and x, y, z, and w satisfy $0.0 \leq x \leq 1.0$, $0.0 < y \leq 0.7$, $0.0 < z \leq 0.8$, and $0.0 < w \leq 0.2$, and M represents the zirconia stabilizing material. As shown in the general formula, the zirconia stabilizing material is set to be added within 20%.

As the zirconia stabilizing material as described above, $Y_2O_3$, CaO, $CaCO_3$, SrO, $SrCO_3$, $Sc_2O_3$, MgO, $CeO_2$, $Al_2O_3$, or the like may be employed.

A method for producing the sintered metal oxide for thermistors, a thermistor element using the same, a method for producing a thermistor temperature sensor, and the structure thereof will be described below with reference to FIGS. 1 to 3.

Firstly, $La_2O_3$ is subject to heat treatment at a temperature of 600° C. to 1100° C. in advance. For example, the powders of $La_2O_3$ are heated at 1000° C. for two hours and dried to thereby regenerate the remaining hydroxide into $La_2O_3$. Also, as the preparation of raw materials $La_2O_3$, those within two to three hours after heating or those stored in a drying box for two to three days after heating are employed. Next, a mixture comprising powders of $La_2O_3$ and at least either one of $CaCO_3$ or $SrCO_2$, or a mixture comprising powders of the mixture and at least either one of $Cr_2O_3$ or $MnO_2$ is prepared. For example, the powders of $La_2O_3$, $CaCO_3$, $SrCO_3$, $Cr_2O_3$, and $MnO_2$ are weighed and placed into a ball mill. A proper amount of Zr ball and ethanol is added to the ball mill, and the resulting mixture is subject to mixing for about 24 hours. For the each raw material, a hydroxide compound, a carbonate compound, or a metal oxide having a different valence may also be used.

The mixture is removed and dried, and then is sintered at 1100° C. for five hours to obtain the calcined powder of $La_{0.7}Ca_{0.3}(Cr_{0.6}Mn_{0.4})O_3$, wherein in the general formula, A represents Ca, x represents 0.4, and y represents 0.3. This calcined powder and the new powders of $Y_2O_2$, MgO, and $ZrO_2$ serving as insulator materials are weighed, pulverized and mixed in a ball mill using a Zr ball and ethanol, and then dried. It should be noted that when the calcined powder is mixed with the insulator materials or only the calcined powder is pulverized, a small amount of $CaCO_3$ or $SrCO_3$ may be added as a sintering aid.

Next, 5 wt % PVA (polyvinyl alcohol, 10 wt % aqueous solution) is mixed and dried to obtain a mixed calcined powder. The dried powder is granulated through a sieve having an opening diameter of 60 μm and lightly molded using a double-hole mold. Then, as shown in FIG. 1, one end of a pair of lead wires (1), which are platinum wires having φ 0.3 mm, is inserted thereto. One-axis press molding (1000 kg/cm²) is then carried out to thereby cause the lead wires (1) to be fixedly embedded in the mixed calcined powder.

Next, a binder-removing treatment (sintering at about 1600° C.) is performed, and then the resulting sintered body is subject to heat treatment at a temperature from 900° C. to 1100° C. For example, by performing annealing treatment at 1000° C., a thermistor element (3) including a sintered metal oxide for thermistors (2) that is a complex oxide represented by the general formula: $(1-z)La_{1-y}A_y(Cr_{1-x}Mn_x)O_3+z((1-w)ZrO_2+wM)$ (with the proviso that A represents at least either one of Ca or Sr, and x, y, z, and w satisfy $0.0 \leq x \leq 1.0$, $0.0 < y \leq 0.7$, $0.0 < z \leq 0.8$, and $0.0 < w \leq 0.2$, and M represents the zirconia stabilizing material), and two lead wires (1) are obtained.

Note that a complex oxide in which a zirconia stabilizing material ($Y_2O_3$, CaO, SrO, or the like) within 20% has been added as another insulator material to the powder of $ZrO_2$ may also be employed.

A method for producing a calcined powder of the zirconia stabilizing material is the same as a method for producing a calcined powder of $La_{1-y}A_y(Cr_{1-x}Mn_x)O_3$ except that the temperature of calcination is in the range of from 1300° C. to 1500° C. and the time of calcination is five hours or longer.

When $ZrO_2$ is used to be added alone as an insulator material, annealing needs to be performed at a temperature of 900° C. or higher after sintering at 1600° C. This is because electrical characteristics may change upon receiving thermal history as shown in FIG. 3 when $ZrO_2$ is used alone. However, when a zirconia stabilizing material such as $Y_2O_3$, CaO, or the like has been added as described above, annealing becomes unnecessary. Even when a zirconia stabilizing material has been added, an annealing treatment may be performed after sintering at 1600° C.

Figure 2:
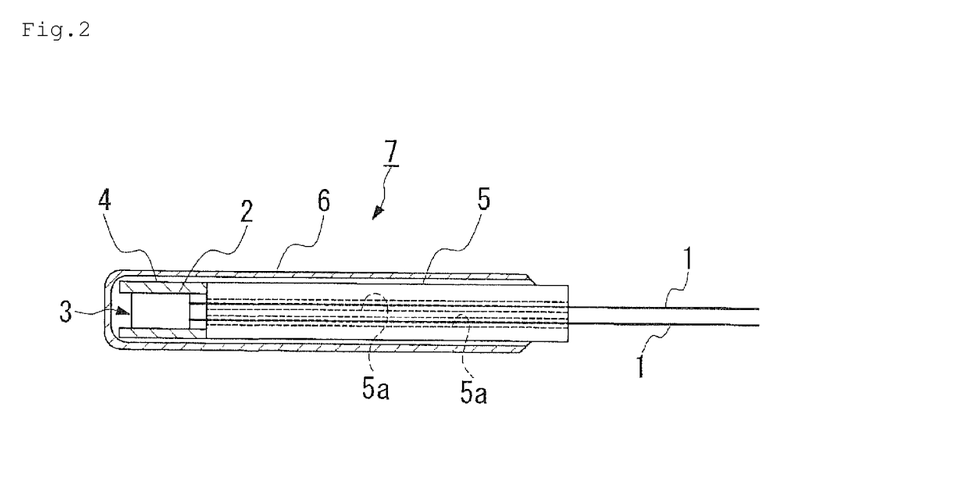
FIG. 2 is a cross-sectional view illustrating a thermistor temperature sensor according to the present embodiment.
Figure 3:
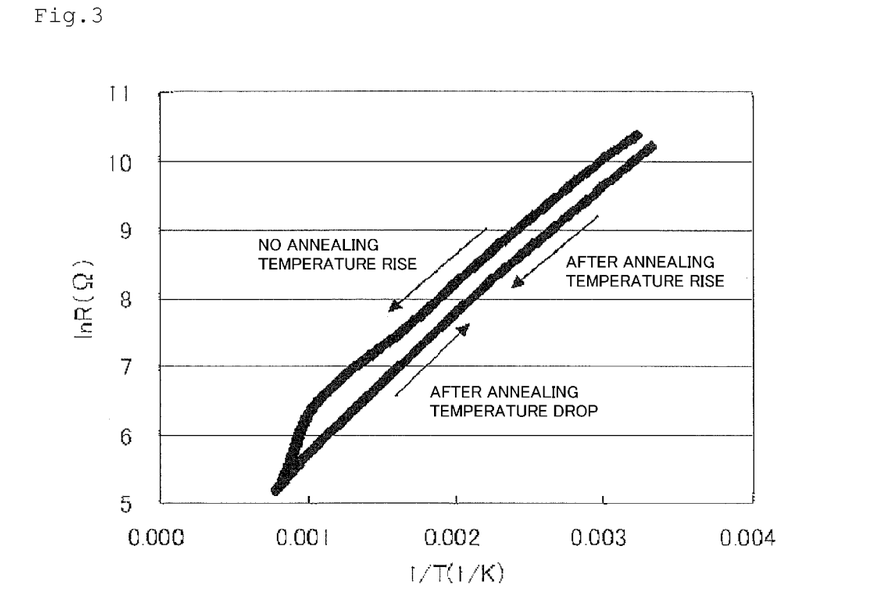
FIG. 3 is a graph illustrating a change in electrical characteristics relative to a temperature depending on the presence or absence of annealing, when $ZrO_2$ is employed alone, according to the present embodiment.

Next, as shown in FIG. 2, an insulating ceramic tube (4) is fitted into the sintered metal oxide for thermistors (2) so as to wrap peripherally therearound. Furthermore, two lead wires (1) are inserted through two holes (5a) of an alumina double-hole insulating tube (5), respectively, so as to protect the lead wires (1) up to the root ends thereof using the double-hole insulating tube (5). Then, the thermistor element (3) in this condition is placed into a cylindrical stainless case (6) of which the leading end is closed so as to ensure airtightness. Consequently, a thermistor temperature sensor (7) is obtained.

As described above, in the present embodiment, the sintered metal oxide for thermistors (2) of the thermistor element (3) includes a complex oxide represented by the general formula: $La_{1-y}A_y(Cr_{1-x}Mn_x)O_3$, with the proviso that A represents at least either one of Ca or Sr, and x and y satisfy $0.0 \leq x \leq 1.0$, $0.0 < y \leq 0.7$. Since a part of La at the A-site is substituted with Ca or Sr, a complex oxide can be obtained with a predetermined reduced amount of La. Furthermore, since Ca or Sr compensates for the decrease of La, an element can be filled the A-site of the perovskite oxide in the 100% manner, whereby the remaining of unreacted $La_2O_3$ in a sintered body can be prevented. This allows for the rate of change in resistance value to be suppressed to 1% or lower. By changing the ratio between La and Ca or La and Sr or the ratio between Cr and Mn, the constant B of the sintered metal oxide for thermistors can be in the range of 1000 K to 4200 K. In particular, the material having the constant B of 2500 K or less has the constant B lower than that of the conventional one, and thus can measure a very wide range of temperature (from −40° C. to approximately 1100° C.).

Also, an insulator material is added to the complex oxide, and thus the resistance value can be increased depending on the amount of the insulator material added. In particular, $ZrO_2$, $Y_2O_3$, and MgO are added as the insulator materials to an (La, Ca, Sr) (Cr, Mn)$O_3$-type powder material for mixing and sintering. This allows for the rate of change in resistance value to be suppressed to 1% or lower.

Furthermore, if a zirconia stabilizing material is further added to the complex oxide to which $ZrO_2$ has been added, a stable $ZrO_2$ structure may be obtained for thermal history, and thus a change in electrical characteristics can be prevented. In this case, excellent heat resistance can be obtained by setting a zirconia stabilizing material to be mixed within 20%.

In addition, if the step of subjecting a heat treatment (annealing treatment) to the mixed sintered body, to which $ZrO_2$ has been added, at a temperature of 900° C. or higher, is provided, a change in electrical characteristics of $ZrO_2$ caused by a structure phase transition thereof upon thermal history can be suppressed.

Also, $La_2O_3$ is subject to heat treatment at a temperature of 600° C. to 1100° C. in advance and then mixed. Thus, the mixture of $La(OH)_3$ mixed in $La_2O_3$ is regenerated into $La_2O_3$ by heating, which prevents $La(OH)_3$, which becomes a factor of instability, from being mixed.

Example 1

Next, the evaluation results obtained by an actually produced Example for a sintered metal oxide for thermistors, a thermistor element, and a method for producing a sintered metal oxide for thermistors according to the present invention will be specifically described with reference to FIG. 4 and FIG. 5.

Figure 4:
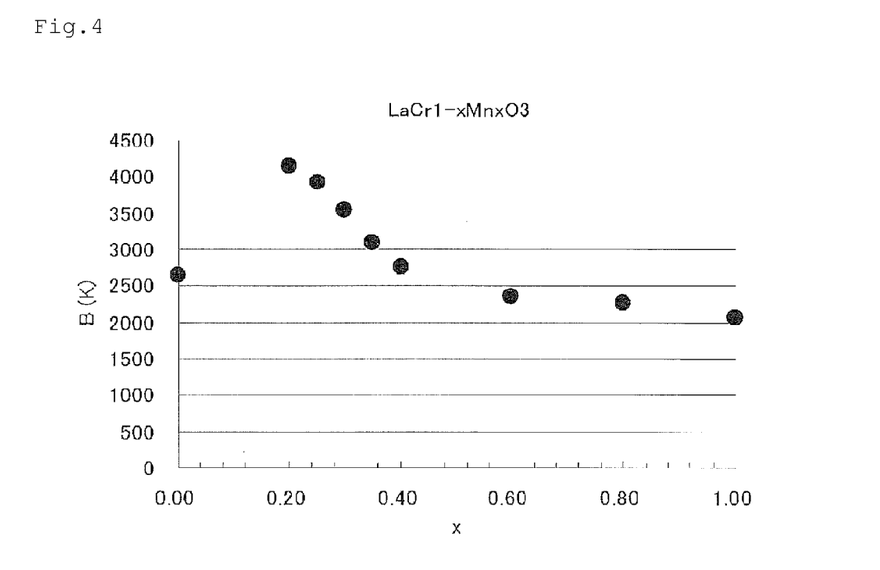
FIG. 4 is a graph illustrating the x dependency of the constant B with respect to $La_{1.0}(Cr_{1-x}Mn_x)O_3$.
Figure 5:
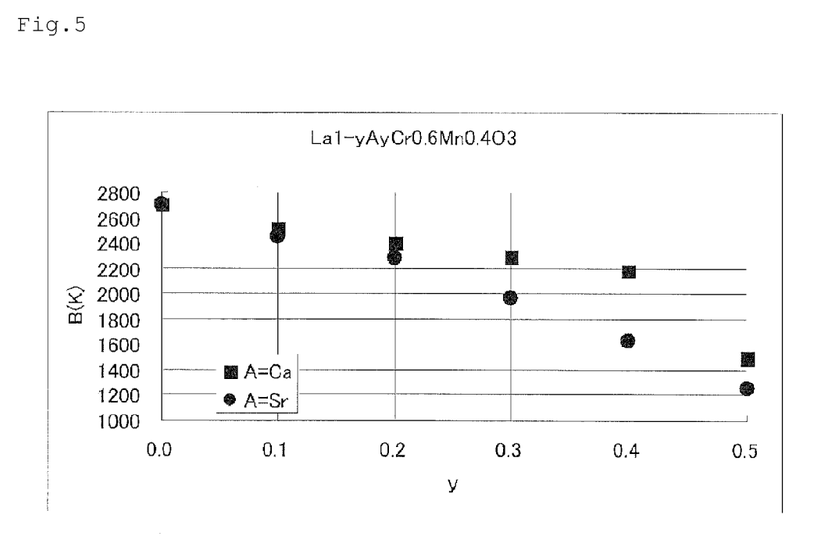
FIG. 5 is a graph illustrating the y dependency of the constant B with respect to $La_{1-y}A_y(Cr_{1-x}Mn_x)O_3$ (with the proviso that A represents Ca or Sr and x is 0.4) of the present embodiment.

Firstly, the examined results of the x dependency of the constant B with respect to $La_{1.0}(Cr_{1-x}Mn_x)O_3$ are shown in FIG. 4. As can be seen from FIG. 4, the constant B of $La_{1.0}(Cr_{1-x}Mn_x)O_3$ is in the range of from 2000 to 4200 K. In the area where $x \geq 0.2$, the constant B can be reduced by increasing the proportion of Mn.

The definition formula of the constant B:

$$B(25/50) = \ln(R25/R50)/(1/T25 - 1/T50)$$

R25=resistance value at 25° C. (Ω)
R50=resistance value at 50° C. (Ω)
T25=value in which 25° C. is converted to the absolute temperature (=298.15 K)
T50=value in which 50° C. is converted to the absolute temperature (=323.15 K)

Next, the examined results of the y dependency of the constant B with respect to the material of the present Example: $La_{1-y}A_y(Cr_{1-x}Mn_x)O_3$ (with the proviso that A represents Ca or Sr, and x represents 0.4) in which the ratio between Cr and Mn is fixed and the La-site is substituted with Ca or Sr are shown in FIG. 5. As can be seen from FIG. 5, when the La-site is substituted with Ca or Sr, the constant B can be reduced. In particular, when 50% of the La-site is substituted with Ca or Sr, the constant B becomes very low of about 1200 K. From the results shown in FIGS. 4 and 5, a very wide range of the constant B from 1000 to 4200 K can be selected and provided by adjusting the ratio (x) between Cr and Mn, and the ratio (y) between La and Ca or Sr. In particular, the provision of a thermistor material having a low constant B (about 2500 K or below) allows it to measure a very wide range of temperature (from −40° C. to approximately 1100° C.).

Next, $La_{1-y}A_y(Cr_{1-x}Mn_x)O_3$ and (1−z) $La_{1-y}A_y(Cr_{1-x}Mn_x)O_3 + zB$ (wherein B represents $Y_2O_3$, $ZrO_2$, or MgO) were produced, and a waiting test was performed at high temperature. In this test, a change over time of a resistance value was measured using the thermistor element (3) as shown in FIG. 1 when the thermistor element (3) was held at 1100° C. for 100 hours. As Comparative Examples, a conventional sintered metal oxide for thermistors, i.e., $Y(Cr_{0.5}Mn_{0.5})O_3$ was likewise produced, and a waiting test was performed. In addition, Ca or Sr-free sample: $La(Cr_{0.6}Mn_{0.4})O_3$ was also prepared and the effect of Ca or Sr substitution was also examined. The results are shown in the following Table 1.

TABLE 1

| THERMISTOR MATERIAL COMPOSITION | RATE OF CHANGE IN RESISTANCE VALUE (%) |
|---|---|
| $Y(Cr_{0.5}Mn_{0.5})O_3$ | −5 |
| $La_{1.0}(Cr_{0.6}Mn_{0.4})O_3$ | −3 |
| $La_{0.9}Ca_{0.1}(Cr_{0.6}Mn_{0.4})O_3$ | −1 |
| $La_{0.7}Ca_{0.3}(Cr_{0.6}Mn_{0.4})O_3$ | −1 |
| $La_{0.3}Ca_{0.7}(Cr_{0.6}Mn_{0.4})O_3$ | −1 |
| $La_{0.2}Ca_{0.8}(Cr_{0.6}Mn_{0.4})O_3$ | 5 |
| $La_{0.9}Sr_{0.1}(Cr_{0.6}Mn_{0.4})O_3$ | 1 |

TABLE 1-continued

| THERMISTOR MATERIAL COMPOSITION | RATE OF CHANGE IN RESISTANCE VALUE (%) |
|---|---|
| $La_{0.7}Sr_{0.3}(Cr_{0.6}Mn_{0.4})O_3$ | −1 |
| $La_{0.3}Sr_{0.7}(Cr_{0.6}Mn_{0.4})O_3$ | −1 |
| $La_{0.2}Sr_{0.8}(Cr_{0.6}Mn_{0.4})O_3$ | −5 |
| $La_{0.7}Ca_{0.15}Sr_{0.15}(Cr_{0.6}Mn_{0.4})O_3$ | −1 |

As shown in Table 1, when $Y(Cr_{0.5}Mn_{0.5})O_3$ in Comparative Example was employed, the rate of change in resistance value was about 5%. Also, the rate of change in the resistance value of $La(Cr_{0.6}Mn_{0.4})O_3$ was about 3%. In contrast, in $La_{1-y}A_y(Cr_{0.6}Mn_{0.4})O_3$ (with the proviso that A represents Ca or Sr) of the present Example, it is found that the rate of change in resistance value is significantly suppressed to about 1%. Also, for the material in the present Example in which both Ca and Sr were mixed, it is found that the rate of change in resistance value remains about 1%. When 80% or more of Ca or Sr is substituted ($y \geq 0.8$), the rate of change in resistance value was increased to about 5%. As described above, in the present invention, it is found that the rate of change in resistance value is about 1% even when the thermistor element (3) is held at 1100° C. for 100 hours and thus a property variation is very small. Also, it is found that the combination of La and Ca or La and Sr can be the cause of suppressing the rate of change in resistance value.

Likewise, the examined results of the materials to which an insulator material has been added are shown in the following Table 2.

As shown in Table 2, also in the materials to which an insulator material has been added, i.e., $(0.3)La_{1-y}A_y(Cr_{0.6}Mn_{0.4})O_3+0.7B$ (wherein B represents $Y_2O_3$, $ZrO_2$, or MgO), it is found that the rate of change in resistance value is suppressed to about 1%. For the material in which $Y_2O_3$ has been added to the material, i.e., $La(Cr_{0.6}Mn_{0.4})O_3$, to which Ca or Sr has not been added, it is found that the rate of change in resistance value is relatively large (about 5%). This result indicates that the rate of change in resistance value becomes small by adding an insulator material Ca or Sr to La. In other words, the addition of Ca or Sr to La is important.

TABLE 2

| THERMISTOR MATERIAL COMPOSITION | RATE OF CHANGE IN RESISTANCE VALUE (%) |
|---|---|
| $0.3La_{1.0}(Cr_{0.6}Mn_{0.4})O_3 + 0.7Y_2O_3$ | −5 |
| $0.3La_{0.7}Ca_{0.3}(Cr_{0.6}Mn_{0.4})O_3 + 0.7Y_2O_3$ | −1 |
| $0.3La_{0.7}Ca_{0.3}(Cr_{0.6}Mn_{0.4})O_3 + 0.7ZrO_2$ | −1 |
| $0.3La_{0.7}Ca_{0.3}(Cr_{0.6}Mn_{0.4})O_3 + 0.7MgO$ | 1 |
| $0.3La_{0.7}Sr_{0.3}(Cr_{0.6}Mn_{0.4})O_3 + 0.7Y_2O_3$ | −1 |
| $0.3La_{0.7}Sr_{0.3}(Cr_{0.6}Mn_{0.4})O_3 + 0.7ZrO_2$ | 1 |
| $0.3La_{0.7}Sr_{0.3}(Cr_{0.6}Mn_{0.4})O_3 + 0.7MgO$ | 1 |

As shown in Tables 3 to 5, even when the ratio (x) between Cr and Mn is changed, the rate of change in resistance value may be suppressed to about 1%. Even when Cr or Mn is not contained, the rate of change in resistance value may be suppressed to about 1%. Specifically, it is found that the combination of La and Ca or La and Sr can be the cause of suppressing the rate of change in resistance value without depending on the amount of Cr and Mn.

TABLE 3

| THERMISTOR MATERIAL COMPOSITION | RATE OF CHANGE IN RESISTANCE VALUE (%) |
|---|---|
| $0.3La_{0.7}Ca_{0.3}MnO_3 + 0.7Y_2O_3$ | −1 |
| $0.3La_{0.7}Ca_{0.3}(Cr_{0.1}Mn_{0.9})O_3 + 0.7Y_2O_3$ | −1 |
| $0.3La_{0.7}Ca_{0.3}(Cr_{0.6}Mn_{0.4})O_3 + 0.7Y_2O_3$ | −1 |
| $0.3La_{0.7}Ca_{0.3}(Cr_{0.9}Mn_{0.1})O_3 + 0.7Y_2O_3$ | −1 |
| $0.3La_{0.7}Ca_{0.3}CrO_3 + 0.7Y_2O_3$ | 1 |
| $0.3La_{0.7}Sr_{0.3}MnO_3 + 0.7Y_2O_3$ | 1 |
| $0.3La_{0.7}Sr_{0.3}(Cr_{0.1}Mn_{0.9})O_3 + 0.7Y_2O_3$ | −1 |
| $0.3La_{0.7}Sr_{0.3}(Cr_{0.6}Mn_{0.4})O_3 + 0.7Y_2O_3$ | −1 |
| $0.3La_{0.7}Sr_{0.3}(Cr_{0.9}Mn_{0.1})O_3 + 0.7Y_2O_3$ | 1 |
| $0.3La_{0.7}Sr_{0.3}CrO_3 + 0.7Y_2O_3$ | −1 |

TABLE 4

| THERMISTOR MATERIAL COMPOSITION | RATE OF CHANGE IN RESISTANCE VALUE (%) |
|---|---|
| $0.3La_{0.7}Ca_{0.3}MnO_3 + 0.7ZrO_2$ | −1 |
| $0.3La_{0.7}Ca_{0.3}(Cr_{0.1}Mn_{0.9})O_3 + 0.7ZrO_2$ | 1 |
| $0.3La_{0.7}Ca_{0.3}(Cr_{0.6}Mn_{0.4})O_3 + 0.7ZrO_2$ | −1 |
| $0.3La_{0.7}Ca_{0.3}(Cr_{0.9}Mn_{0.1})O_3 + 0.7ZrO_2$ | 1 |
| $0.3La_{0.7}Ca_{0.3}CrO_3 + 0.7ZrO_2$ | −1 |
| $0.3La_{0.7}Sr_{0.3}MnO_3 + 0.7ZrO_2$ | 1 |
| $0.3La_{0.7}Sr_{0.3}(Cr_{0.1}Mn_{0.9})O_3 + 0.7ZrO_2$ | 1 |
| $0.3La_{0.7}Sr_{0.3}(Cr_{0.6}Mn_{0.4})O_3 + 0.7ZrO_2$ | 1 |
| $0.3La_{0.7}Sr_{0.3}(Cr_{0.9}Mn_{0.1})O_3 + 0.7ZrO_2$ | −1 |
| $0.3La_{0.7}Sr_{0.3}CrO_3 + 0.7ZrO_2$ | −1 |

TABLE 5

| THERMISTOR MATERIAL COMPOSITION | RATE OF CHANGE IN RESISTANCE VALUE (%) |
|---|---|
| $0.3La_{0.7}Ca_{0.3}MnO_3 + 0.7MgO$ | 1 |
| $0.3La_{0.7}Ca_{0.3}(Cr_{0.1}Mn_{0.9})O_3 + 0.7MgO$ | −1 |
| $0.3La_{0.7}Ca_{0.3}(Cr_{0.6}Mn_{0.4})O_3 + 0.7 MgO$ | −1 |
| $0.3La_{0.7}Ca_{0.3}(Cr_{0.9}Mn_{0.1})O_3 + 0.7 MgO$ | −1 |
| $0.3La_{0.7}Ca_{0.3}CrO_3 + 0.7MgO$ | −1 |
| $0.3La_{0.7}Sr_{0.3}MnO_3 + 0.7 MgO$ | −1 |
| $0.3La_{0.7}Sr_{0.3}(Cr_{0.1}Mn_{0.1})O_3 + 0.7 MgO$ | −1 |
| $0.3La_{0.7}Sr_{0.3}(Cr_{0.6}Mn_{0.4})O_3 + 0.7 MgO$ | −1 |
| $0.3La_{0.7}Sr_{0.3}(Cr_{0.9}Mn_{0.1})O_3 + 0.7 MgO$ | −1 |
| $0.3La_{0.7}Sr_{0.3}CrO_3 + 0.7 MgO$ | −1 |

Furthermore, as shown in Tables 6 to 8, the rate of change in resistance value may be suppressed to about 1% even when the percentage (z) of an insulator material ($Y_2O_3$, $ZrO_2$, or MgO) is changed. Specifically, the rate of change in resistance value may be suppressed when La and Ca or La and Sr is contained in the conducting material without depending on the amount of an insulator material. Note that if the percentage (z) of an insulator material exceeds 80%, the amount of the conducting material $La_{1-y}A_y(Cr_{1-x}Mn_x)O_3$ (with the proviso that A represents Ca or Sr) becomes small. Consequently, the resistance value becomes large and thus cannot be measured.

TABLE 6

| THERMISTOR MATERIAL COMPOSITION | RATE OF CHANGE IN RESISTANCE VALUE (%) |
|---|---|
| $0.7La_{0.7}Ca_{0.3}(Cr_{0.6}Mn_{0.4})O_3 + 0.3Y_2O_3$ | 1 |
| $0.3La_{0.7}Ca_{0.3}(Cr_{0.6}Mn_{0.4})O_3 + 0.7Y_2O_3$ | −1 |
| $0.2La_{0.7}Ca_{0.3}(Cr_{0.6}Mn_{0.4}))O_3 + 0.8Y_2O_3$ | 1 |
| $0.7La_{0.7}Sr_{0.3}(Cr_{0.6}Mn_{0.4})O_3 + 0.3Y_2O_3$ | 1 |
| $0.3La_{0.7}Sr_{0.3}(Cr_{0.6}Mn_{0.4})O_3 + 0.7Y_2O_3$ | 1 |
| $0.2La_{0.7}Sr_{0.3}(Cr_{0.6}Mn_{0.4})O_3 + 0.8Y_2O_3$ | 1 |

TABLE 7

| THERMISTOR MATERIAL COMPOSITION | RATE OF CHANGE IN RESISTANCE VALUE (%) |
|---|---|
| $0.7La_{0.7}Ca_{0.3}(Cr_{0.6}Mn_{0.4})O_3 + 0.3\ ZrO_2$ | 1 |
| $0.3La_{0.7}Ca_{0.3}(Cr_{0.6}Mn_{0.4})O_3 + 0.7\ ZrO_2$ | 1 |
| $0.2La_{0.7}Ca_{0.3}(Cr_{0.6}Mn_{0.4})O_3 + 0.8\ ZrO_2$ | −1 |
| $0.7La_{0.7}Sr_{0.3}(Cr_{0.6}Mn_{0.4})O_3 + 0.3\ ZrO_2$ | −1 |
| $0.3La_{0.7}Sr_{0.3}(Cr_{0.6}Mn_{0.4})O_3 + 0.7\ ZrO_2$ | −1 |
| $0.2La_{0.7}Sr_{0.3}(Cr_{0.6}Mn_{0.4})O_3 + 0.8\ ZrO_2$ | −1 |

TABLE 8

| THERMISTOR MATERIAL COMPOSITION | RATE OF CHANGE IN RESISTANCE VALUE (%) |
|---|---|
| $0.7La_{0.7}Ca_{0.3}(Cr_{0.6}Mn_{0.4})O_3 + 0.3\ MgO$ | −1 |
| $0.3La_{0.7}Ca_{0.3}(Cr_{0.6}Mn_{0.4})O_3 + 0.7\ MgO$ | −1 |
| $0.2La_{0.7}Ca_{0.3}(Cr_{0.6}Mn_{0.4})O_3 + 0.8\ MgO$ | −1 |
| $0.7La_{0.7}Sr_{0.3}(Cr_{0.6}Mn_{0.4})O_3 + 0.3\ MgO$ | −1 |
| $0.3La_{0.7}Sr_{0.3}(Cr_{0.6}Mn_{0.4})O_3 + 0.7\ MgO$ | −1 |
| $0.2La_{0.7}Sr_{0.3}(Cr_{0.6}Mn_{0.4})O_3 + 0.8\ MgO$ | −1 |

Furthermore, as the present Example, complex oxides in which other insulator material ($Y_2O_3$, CaO, SrO, $Sc_2O_3$, MgO, $CeO_2$, or $Al_2O_3$) as a zirconia stabilizing material has been added within 20% to $ZrO_2$ are shown in Table 9. Likewise, a complex oxide to which a zirconia stabilizing material $Y_2O_3$ has been added exceeding 20% was evaluated. As can be seen from Table 9, it is found that the rate of change in the resistance value of a complex oxide to which a zirconia stabilizing material has been added within 20% is suppressed.

TABLE 9

| THERMISTOR MATERIAL COMPOSITION | RATE OF CHANGE IN RESISTANCE VALUE (%) |
|---|---|
| $0.3\ La_{0.7}Ca_{0.3}(Cr_{0.6}Mn_{0.4})O_3 + 0.7ZrO_2$ | 1 |
| $0.3\ La_{0.7}Ca_{0.3}(Cr_{0.6}Mn_{0.4})O_3 + 0.7(0.95ZrO_2 + 0.05Y_2O_3)$ | −1 |
| $0.3\ La_{0.7}Ca_{0.3}(Cr_{0.6}Mn_{0.4})O_3 + 0.7(0.90ZrO_2 + 0.10Y_2O_3)$ | −1 |
| $0.3\ La_{0.7}Ca_{0.3}(Cr_{0.6}Mn_{0.4})O_3 + 0.7(0.80ZrO_2 + 0.20Y_2O_3)$ | −1 |
| $0.3\ La_{0.7}Ca_{0.3}(Cr_{0.6}Mn_{0.4})O_3 + 0.7(0.70ZrO_2 + 0.30Y_2O_3)$ | −3 |
| $0.3\ La_{0.7}Ca_{0.3}(Cr_{0.6}Mn_{0.4})O_3 + 0.7(0.95ZrO_2 + 0.05MgO)$ | −1 |
| $0.3\ La_{0.7}Ca_{0.3}(Cr_{0.6}Mn_{0.4})O_3 + 0.7(0.95ZrO_2 + 0.05CaO)$ | −1 |
| $0.3\ La_{0.7}Ca_{0.3}(Cr_{0.6}Mn_{0.4})O_3 + 0.7(0.95ZrO_2 + 0.05SrO)$ | −1 |
| $0.3\ La_{0.7}Ca_{0.3}(Cr_{0.6}Mn_{0.4})O_3 + 0.7(0.95ZrO_2 + 0.05CeO_2)$ | −1 |
| $0.3\ La_{0.7}Ca_{0.3}(Cr_{0.6}Mn_{0.4})O_3 + 0.7(0.95ZrO_2 + 0.05Sc_2O_3)$ | −1 |
| $0.3\ La_{0.7}Ca_{0.3}(Cr_{0.6}Mn_{0.4})O_3 + 0.7(0.95ZrO_2 + 0.05Al_2O_3)$ | 1 |

As described above, when $ZrO_2$ is used alone, annealing needs to be performed at a temperature of 900° C. or higher after sintering at 1600° C. However, when a zirconia stabilizing material is added, annealing becomes unnecessary after sintering. As shown in Table 10, when the zirconia stabilizing material is added exceeding 20%, such zirconia stabilizing material may affect the heat resistance (an increase (decrease) in the change in resistance value, and the occurrence of cracking at the heat cycle test (HCT)). Note that the heat cycle test (HCT) was performed under the condition that the cycle was alternately switched from room temperature to 1000° C. in 100 times.

TABLE 10

| THERMISTOR MATERIAL COMPOSITION | PRESENCE/ABSENCE OF CRACKING AT HCT TEST |
|---|---|
| $0.3La_{0.9}(Cr_{0.6}Mn_{0.4})O_3 + 0.7ZrO_2$ | NONE |
| $0.3\ La_{0.7}Ca_{0.3}(Cr_{0.6}Mn_{0.4})O_3 + 0.7(0.95ZrO_2 + 0.05Y_2O_3)$ | NONE |
| $0.3\ La_{0.7}Ca_{0.3}(Cr_{0.6}Mn_{0.4})O_3 + 0.7(0.90ZrO_2 + 0.10Y_2O_3)$ | NONE |
| $0.3\ La_{0.7}Ca_{0.3}(Cr_{0.6}Mn_{0.4})O_3 + 0.7(0.80ZrO_2 + 0.20Y_2O_3)$ | NONE |
| $0.3\ La_{0.7}Ca_{0.3}(Cr_{0.6}Mn_{0.4})O_3 + 0.7(0.70ZrO_2 + 0.30Y_2O_3)$ | PARTIALLY OCCURRED |

The technical scope of the present invention is not limited to the aforementioned embodiments, but the present invention may be altered in various ways without departing from the scope or teaching of the present invention.

Second Embodiment

Hereinafter, one embodiment of a sintered metal oxide for thermistors, a thermistor element, a thermistor temperature sensor, and a method for producing a sintered metal oxide for thermistors of the present invention will be described with reference to FIGS. 6 and 7.

The sintered metal oxide for thermistors of the present embodiment is a sintered metal oxide used for thermistors, whose principal component is a complex oxide represented by the general formula: $(La_{1-y}Y_y)_{1-z}A_z(Cr_{1-x}Mn_x)O_3$ (with the proviso that A represents at least either one of Ca or Sr, and x, y, and z satisfy $0.0 \leq x \leq 1.0$, $0.0 < y < 1.0$, and $0.0 < z \leq 0.7$).

Also, in the sintered metal oxide for thermistors, it is preferable that an insulator material is added to the complex oxide. As an insulator material, MgO, $CeO_2$, $ZrO_2$, $Al_2O_3$, $Y_2O_3$, or the like can be employed. $Y_2O_3$ is particularly preferred.

More specifically, the aforementioned complex oxide is preferably a complex oxide represented by the general formula: $1-w(La_{1-y}Y_y)_{1-z}A_z(Cr_{1-x}Mn_x)O_3 + wY_2O_3$, with the proviso that A represents at least either one of Ca or Sr, and x, y, z, and w satisfy $0.0 \leq x \leq 1.0$, $0.0 < y < 1.0$, $0.0 < z \leq 0.7$, and $0.0 < w \leq 0.8$.

A method for producing the sintered metal oxide for thermistors, a thermistor element using the same, a method for producing a thermistor temperature sensor, and the structure thereof will be described below with reference to FIG. 6 and FIG. 7.

Firstly, the powders of $La_2O_3$ are heated at 1000° C. for two hours and dried to thereby regenerate the remaining hydroxide into $La_2O_3$. As the preparation of raw materials $La_2O_3$, those within two to three hours after heating or those stored in a drying box for two to three days after heating are employed.

Next, the powders of at least one of $La_2O_3$, $Y_2O_3$, $CaCO_3$, and $SrCO_3$ and the powders of $Cr_2O_3$ and $MnO_2$ are weighed and placed into a ball mill. A proper amount of Zr ball and ethanol is added to the ball mill, and the resulting mixture is subject to mixing for about 24 hours. For the raw materials, a hydroxide compound, a carbonate compound, or a metal oxide having a different valence may also be used. For example, as a Mn compound, $MnCO_2$, $Mn_3O_4$, or $Mn_2O_3$ may be employed. The mixture is removed and dried, and then is sintered at 1300° C. for five hours to obtain the calcined powder of $(La_{0.5}Y_{0.5})_{0.7}Ca_{0.3}(Cr_{0.6}Mn_{0.4})O_3$, wherein in the general formula, A represents Ca, x represents 0.4, y represents 0.5, z represents 0.3, and w represents 0.0.

Next, the calcined powder and the new powder of $Y_2O_3$ are weighed and added with a small amount of a sintering aid, and then the resulting mixture is mixed together and pulverized in a ball mill using a Zr ball and ethanol. Also, when the calcined powder, $Y_2O_3$, and the sintering aid are mixed together and La does not remain independently within the calcined powder, pure water may be employed for mixture and pulverization. The mixture is mixed for about 24 hours, and then dried to obtain thermistor raw material powder made of the calcined powder-containing mixture. For example, the thermistor raw material powders are represented by $0.4[(La_{0.5}Y_{0.5})_{0.7}Ca_{0.3}(Cr_{0.6}Mn_{0.4})O_3]+0.6Y_2O_3$, wherein in the general formula, A represents Ca, x represents 0.4, and y represents 0.5, z represents 0.3, and w represents 0.6. When A represents Ca, a sintering aid is preferably $CaCO_3$, whereas when A represents Sr, a sintering aid is preferably $SrCO_3$. However, for example, when A represents Sr, $CaCO_3$ may be used as a sintering aid, whereby sintering may be facilitated and thus a higher-density molding may be produced. As a sintering aid, oxide such as CaO or SrO may be used.

Even when $Y_2O_3$ is not added to the calcined powder, it is preferred that a small amount of $CaCO_3$ or $SrCO_3$ serving as a sintering aid is added. Also, it is preferred that the calcined powder is mixed and pulverized in a ball mill using a Zr ball and ethanol.

Next, thermistor raw material powders consisting of the metal oxide, organic binder powders, and a solvent are mixed together and kneaded to thereby obtain a green body for extrusion molding. In the present embodiment, a methylcellulose system is used as a binder, and pure water is used as a solvent. Furthermore, as additives, a plasticizer, a lubricant, a wetting agent, and the like are added to the organic binder powder. These are mixed in a mixer to obtain a wet powder containing a water-soluble organic binder.

Then, the wet powder containing a water-soluble organic binder is mixed and kneaded by using the screw of a raw material kneading machine to obtain a clay-form green body. Next, the green body is supplied to an extruder, mixed and kneaded using the screw while being vacuumed. Then, the resulting green body is squeezed using the screw, and is extrusion-molded by passing a molding die to thereby form a rod-shaped green molded body having a pair of through holes. In the present embodiment, a rod-shaped green molded body having, for example, the diameter of 2.0 mm and the through hole diameter ("pig-nose" diameter) of 0.34 mm is formed.

Next, after being extrusion-molded, the rod-shaped green molded body is dried and cut to a predetermined length to obtain a cut molded body having pig nose-like through holes. In the present embodiment, a rod-shaped dried molded body is cut into 1.00 mm. For example, the rod-shaped dried molded body is cut with an accuracy of 1.00 mm±0.02 mm, whereby the initial resistance value error may be suppressed within 2% after sintering.

Figure 6:
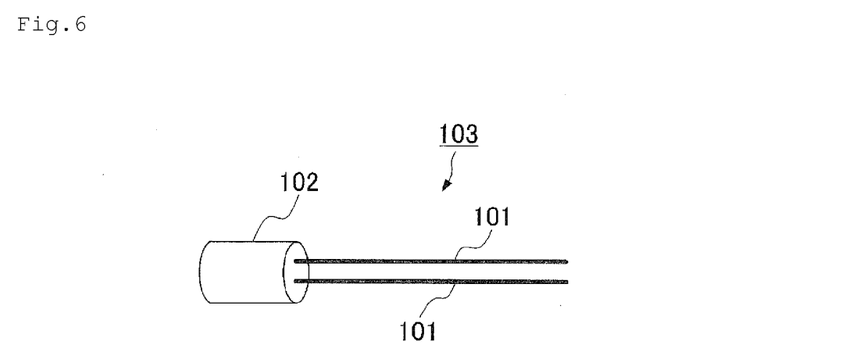
FIG. 6 is a perspective view illustrating a thermistor element in one embodiment of a sintered metal oxide for thermistors, a thermistor element, a thermistor temperature sensor, and a method for producing a sintered metal oxide for thermistors of the present invention.

Next, as shown in FIG. 6, round bar-like lead wires (101) are inserted and pierced through a pair of through holes of the cut molded body. The lead wires (101) are metal wires having a high-melting point at 1400° C. or higher. A Pt wire, a wire in which Pt contains Rh, a wire in which Pt contains Ir, or the like may be employed. Note that the diameter of the through hole in the rod-shaped green molded body is set to be greater than that of the lead wire in consideration of insertion properties when the rod-shaped green molded body is dried to be a rod-shaped dried molded body. Also, the diameter of the through hole of the rod-shaped dried molded body and the cut molded body is set to be smaller than that of the lead wires (101) after sintering in consideration of bondability due to shrinkage during sintering. In the present embodiment, since the lead wire having the diameter of 0.30 mm is inserted into the through hole having the diameter of 0.34 mm and the diameter of the through hole after sintering becomes smaller than 0.30 mm, the lead wires (101) can be bonded.

Next, the cut molded body with the lead wires (101) inserted into its through holes is subjected to binder-removing treatment, and then is sintered at a temperature of from about 1450° C. to 1600° C. to prepare a sintered metal oxide for thermistors (102), and thus the thermistor element (103) is obtained.

Figure 7:
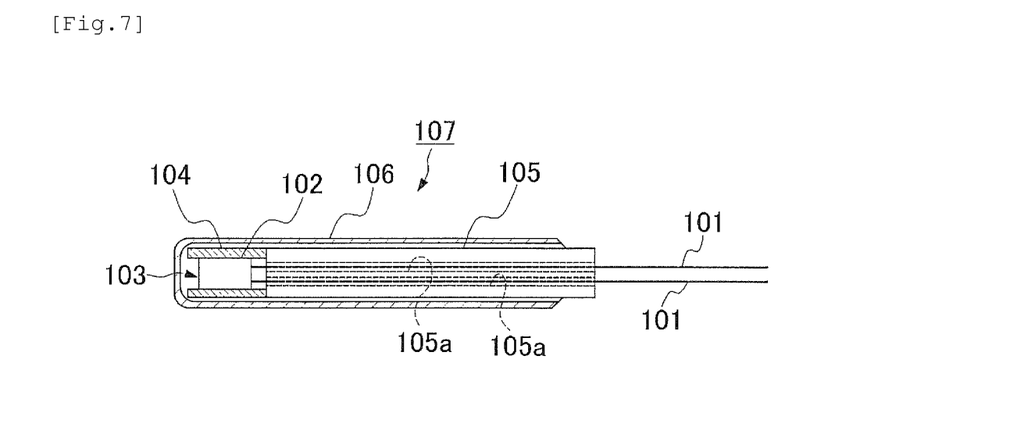
FIG. 7 is a cross-sectional view illustrating a thermistor temperature sensor according to the present embodiment.

Next, as shown in FIG. 7, an insulating ceramic tube (104) is fitted into the sintered metal oxide for thermistors (102) so as to wrap peripherally therearound. Furthermore, two lead wires (101) are inserted through two holes (105a) of an alumina double-hole insulating tube (105), respectively, so as to protect the lead wires (101) up to the root ends thereof using the double-hole insulating tube (105). Then, the thermistor element (103) in this condition is placed into a cylindrical stainless case (106) of which the leading end is closed so as to ensure airtightness. Consequently, a thermistor temperature sensor (107) is obtained.

As described above, in the present embodiment, a sintered metal oxide for thermistors (102) of the thermistor element (103) includes a complex oxide represented by the general formula: $(La_{1-y}Y_y)_{1-z}A_z(Cr_{1-x}Mn_x)O_3$, with the proviso that A represents at least either one of Ca or Sr, and x, y, and z satisfy $0.0 \leq x \leq 1.0$, $0.0 < y < 1.0$, and $0.0 < z \leq 0.7$. Since a part of La at the A-site is substituted with Y, Ca, or Sr, a complex oxide can be obtained with a predetermined reduced amount of La. Furthermore, an element can be filled the A-site of the perovskite oxide in the 100% manner, whereby the remaining of unreacted $La_2O_3$ in a sintered body can be prevented. This allows for the rate of change in resistance value to be suppressed to 2% or lower.

Also, when the proportion of Ca or Sr is increased, the rate of change in resistance value can be further suppressed to 1% or lower.

By changing the ratio between (Y, La) and Ca or Sr, the constant B of the sintered metal oxide for thermistors (102) can be the range of 1000 to 4200 K. In particular, the material having the constant B of 2500 K or less has the constant B lower than that of the conventional one, and thus can measure a very wide range of temperatures (from −40° C. to approximately 1100° C.).

Once La is incorporated in the perovskite oxide, $La(OH)_3$ is not precipitated thereafter. When La is substituted with 70% or greater of Ca or Sr, the change in resistance value increases, and thus preparation of the perovskite oxide is required such that the percentage of La deficiency is equal to or less than 70% ($z \leq 0.7$).

Also, since an insulator material is added to the complex oxide, the resistance value can be increased depending on the amount of the insulator material added. More specifically, the added insulator material allows the electrical conduction pass to be reduced, and thus the resistance value can be increased. Hence, the resistance value can be adjusted by adjusting the amount of insulator material added. In particular, by employing $Y_2O_3$ as an insulator material, an $Y_2O_3$ film is deposited on the surface of a thermistor upon sintering, and thus a reduction caused by taking oxygen from the complex oxide sintered body is suppressed by the $Y_2O_3$ film surface, whereby the change in resistance value can be suppressed. Thus, heat resistance and reduction resistance are realized.

Also, since a perovskite oxide contains Y, sintering is facilitated upon sintering the perovskite oxide mixed with $Y_2O_3$, and thus a high-density molding may be produced. Furthermore, $Y_2O_3$ film deposition is facilitated, and thus high heat resistance and high reduction resistance are realized.

Furthermore, at least either one of $CaCO_3$ or $SrCO_3$ is added as a sintering aid to a perovskite oxide upon sintering, whereby sintering is further facilitated and thus a higher-density molding may be produced.

Therefore, in the thermistor element (103) and the thermistor temperature sensor (107) using the sintered metal oxide for thermistors (102) of the present embodiment, the thermistor element (101) can cover a wide temperature range as a single sensor element, which allows a stable temperature measurement with a small change in resistance value even at high temperature of approximately 1000° C. In particular, the thermistor temperature sensor is suitable as a sensor for high temperature measurements that detects a catalyst temperature, an exhaust-gas system temperature, or the like around automobile engines.

Example 2

Next, the evaluation results obtained by an actually produced Example for a sintered metal oxide for thermistors, a thermistor element, and a method for producing a sintered metal oxide for thermistors according to the present invention will be specifically described with reference to FIG. 8 and Tables 11 to 15.

Figure 8:
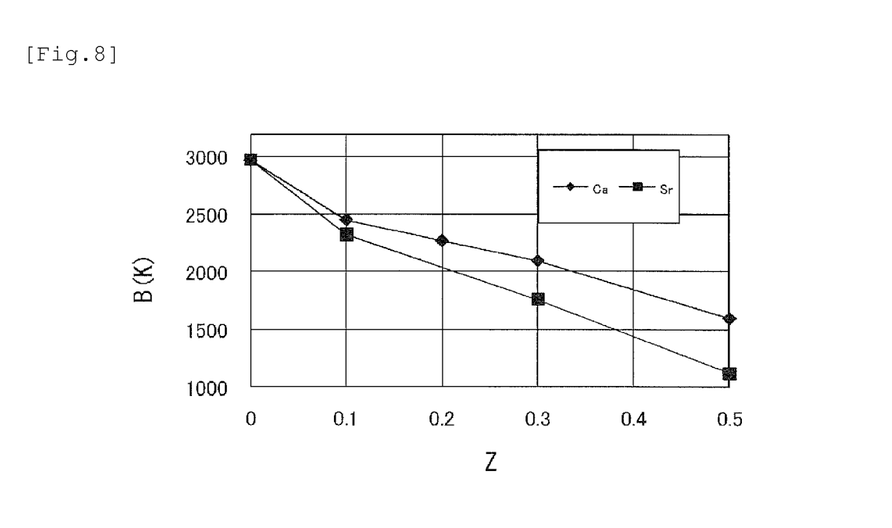
FIG. 8 is a graph of the constant B, when the proportion of Ca or Sr for $(La_{0.5}Y_{0.5})_{1-z}A_z(Cr_{0.55}Mn_{0.45})O_3$ (with the proviso that A represents Ca or Sr) is changed, according to an embodiment of the present invention.

In accordance with the embodiment described above, the thermistor element (103) that is constituted by the sintered metal oxide for thermistors (102), whose principal component is $(La_{0.5}Y_{0.5})_{1-z}A_z(Cr_{0.55}Mn_{0.45})O_3$ (A represents at least either one of Ca or Sr), and the lead wires (101) consisting of Pt is manufactured by way of trial, and the examined results of the z dependency (the ratio dependency of the constant term A) of the constant B thereof are shown in FIG. 8. Here, the constant B is calculated according to the following definition formula. Also, the examined results of the z dependency (the ratio dependency of the constant term A) of the rate of change in resistance value, when the thermistor element (103) is held in the atmosphere at a temperature of 1000° C. for 100 hours, are shown in the following Table 11.

The definition formula of the constant B:

$$B(25/50)=\ln(R25/R50)/(1/T25-1/T50)$$

R25=resistance value at 25° C. ($\Omega$)
R50=resistance value at 50° C. ($\Omega$)
T25=value in which 25° C. is converted to the absolute temperature (=298.15 K)
T50=value in which 50° C. is converted to the absolute temperature (=323.15 K)

TABLE 11

| A | z | RATE OF CHANGE IN RESISTANCE VALUE (%) |
|---|---|---|
| Ca | 0 | -3 |
| Ca | 0.05 | -2 |
| Ca | 0.1 | -1 |
| Ca | 0.2 | -1 |
| Ca | 0.3 | -1 |
| Ca | 0.4 | -1 |
| Ca | 0.5 | -1 |
| Ca | 0.7 | -3 |
| Sr | 0.1 | -1 |
| Sr | 0.2 | -1 |
| Sr | 0.3 | -1 |

TABLE 11-continued

| A | z | RATE OF CHANGE IN RESISTANCE VALUE (%) |
|---|---|---|
| Sr | 0.4 | -1 |
| Sr | 0.5 | -1 |
| Sr | 0.7 | -3 |

As can be seen from the results, the higher the proportion of Ca or Sr to be added becomes, the lower the constant B becomes. The rate of change in resistance value is 3% or lower in any case. In particular, when $0.05<z<0.7$, the rate of change in resistance value is 1% in any case, and thus excellent heat resistance is exhibited.

Example 3

Next, the thermistor element (103) that is constituted by the sintered metal oxide for thermistors (102), whose principal component is $(La_{1-y}Y_y)_{1-z}Ca_z(Cr_{0.55}Mn_{0.45})O_3$, and the lead wires (101) consisting of Pt is manufactured by way of trial, and the examined results of the rate of change in resistance value at the atmosphere and at a temperature of 1000° C. for 100 hours are shown in the following Table 12. In Example 3, the thermistor elements in which the proportion of Y and La has been changed were produced for comparison.

TABLE 12

| | RATE OF CHANGE IN RESISTANCE VALUE (%) |
|---|---|
| $Y_{0.95}Ca_{0.05}(Cr_{0.55}Mn_{0.45})O_3$ | -7 |
| $(La_{0.1}Y_{0.9})_{0.9}Ca_{0.1}(Cr_{0.55}Mn_{0.45})O_3$ | -1 |
| $(La_{0.5}Y_{0.5})_{0.95}Ca_{0.05}(Cr_{0.55}Mn_{0.45})O_3$ | -2 |
| $(La_{0.8}Y_{0.2})_{0.95}Ca_{0.05}(Cr_{0.55}MN_{0.45})O_3$ | -2 |
| $La_{0.95}Ca_{0.05}(Cr_{0.55}Mn_{0.45})O_3$ | -2 |

As can be seen from the results, the rate of change in resistance value is small when La is used rather than Y (y=1.0), and thus a high heat resistance is obtained. Also, an impurity phase of $La(OH)_3$ or $La_2O_3$ is not detected, and a high heat resistance is realized by incorporating all of La in a perovskite oxide.

Example 4

Next, the thermistor element (103) that is constituted by the sintered metal oxide for thermistors (102), whose principal component is $1-w(La_{0.5}Y_{0.5})_{0.7}Ca_{0.3}(Cr_{0.55}Mn_{0.45})O_3 + wY_2O_3$, and the lead wires (101) consisting of Pt is manufactured by way of trial, and the examined results of the dependence of the $Y_2O_3$ amount (w dependency) on the resistance value are shown in the following Table 13.

TABLE 13

| w | RESISTANCE VALUE ($\Omega$) |
|---|---|
| 0 | $3.5 \times 10^2$ |
| 0.3 | $1.1 \times 10^3$ |
| 0.6 | $6.2 \times 10^3$ |
| 0.7 | $1.9 \times 10^4$ |
| 0.8 | $5.0 \times 10^5$ |

As can be seen from the results, when the amount of $Y_2O_3$ increases, the resistance value rises. The resistance value can be adjusted by adjusting the additive amount of $Y_2O_3$.

Example 5

Next, the thermistor element (103) that is constituted by the sintered metal oxide for thermistors (102), whose principal component is $0.4(La_{0.5}Y_{0.5})_{1-z}Ca_z(Cr_{0.55}Mn_{0.45})O_3 + 0.6Y_2O_3$, and the lead wires (101) consisting of Pt is manufactured by way of trial, and the examined results of the rate of change in resistance value at the atmosphere and at a temperature of 1000° C. for 100 hours are shown in the following Table 14.

TABLE 14

| z | RATE OF CHANGE IN RESISTANCE VALUE (%) |
| --- | --- |
| 0.1 | −1 |
| 0.2 | −1 |
| 0.3 | −1 |
| 0.4 | −1 |
| 0.5 | −1 |

As can be seen from the results, when $Y_2O_3$ is added as an insulator material, a sufficient heat resistance is obtained regardless of the amount of Ca. For the material to which $Y_2O_3$ has been added, the $Y_2O_3$ layer having the thickness of 3 μm or greater is precipitated on the outer circumference of the material. The layer thickness of $Y_2O_3$ herein is the thickness from the outer circumference to the place at graining initiation of the crystal grains of the perovskite-type oxide. In this manner, the surface thick $Y_2O_3$ film suppresses oxygen from being taken from a complex oxide sintered body due to reduction, whereby the change in resistance value can be suppressed.

Example 6

Next, for the mixed and sintered body represented by $0.4(La_{1-y}Y_y)_{0.7}Ca_{0.3}(Cr_{0.55}Mn_{0.45})O_3 + 0.6Y_2O_3$, the examined results of the dependence of the amount of Y (y dependency) on the amount of $Y_2O_3$ deposition under the sintering condition at a temperature of 1550° C. for 5 hours are shown in the following Table 15.

TABLE 15

| y | $Y_2O_3$ thickness (μm) |
| --- | --- |
| 0 | <2 |
| 0.2 | 3 |
| 0.5 | 4 |
| 1.0 | 4 |

As can be seen from the results, since Y is contained in the perovskite-type oxide, the $Y_2O_3$ film deposition is facilitated when the perovskite-type oxide and $Y_2O_3$ are mixed and sintered. Thus, a further high reduction resistance is realized.

From these results, it is found that the combination of Y, La, and Ca or Sr is the cause for suppressing the rate of change in resistance value.

The technical scope of the present invention is not limited to the aforementioned embodiments, but the present invention may be modified in various ways without departing from the scope or teaching of the present invention.

REFERENCE NUMERALS

1, 101: lead wire; 2, 102: sintered metal oxide for thermistors; 3, 103: thermistor element, 6, 106: case; 7, 107: thermistor temperature sensor

What is claimed is:

1. A sintered metal oxide used for thermistors having a negative temperature coefficient, comprising:
    a complex oxide represented by the general formula: $La_{1-y}A_y(Cr_{1-x}Mn_x)O_3$, with the proviso that A represents at least either one of Ca or Sr, and x and y satisfy $0.0 \leq x \leq 1.0$ and $0.0 < y \leq 0.7$.

2. The sintered metal oxide for thermistors according to claim 1, wherein an insulator material is added to the complex oxide.

3. The sintered metal oxide for thermistors according to claim 2, wherein at least one of the insulator materials is $ZrO_2$ and a zirconia stabilizing material is further added to the complex oxide.

4. The sintered metal oxide for thermistors according to claim 3, wherein the complex oxide is represented by the general formula: $(1-z)La_{1-y}A_y(Cr_{1-x}Mn_x)O_3 + z((1-w)ZrO_2 + wM)$, with the proviso that A represents at least either one of Ca or Sr, and x, y, z and w satisfy $0.0 \leq x \leq 1.0$, $0.0 < y \leq 0.7$, $0.0 < z \leq 0.8$, and $0.0 < w \leq 0.2$, and M represents the zirconia stabilizing material.

5. A thermistor element comprising:
    the sintered metal oxide for thermistors according to claim 1; and
    at least a pair of lead wires each having an end affixed to the sintered metal oxide for thermistors.

6. A method for producing a sintered metal oxide used for thermistors having a negative temperature coefficient, the method comprising the steps of:
    sintering a mixture comprising powders of $La_2O_3$ and at least either one of $CaCO_3$ or $SrCO_3$, or a mixture comprising powders of the mixture and at least either one of $Cr_2O_3$ or $MnO_2$ to thereby obtain a calcined powder of a complex oxide represented by the general formula: $La_{1-y}A_y(Cr_{1-x}Mn_x)O_3$, with the proviso that A represents at least either one of Ca or Sr, and x and y satisfy $0.0 \leq x \leq 1.0$, and $0.0 < y \leq \leq 0.7$; and
    molding and sintering the calcined powder to thereby obtain a sintered body.

7. The method for producing a sintered metal oxide for thermistors according to claim 6, wherein the $La_2O_3$ is subject to heat treatment at a temperature of 600° C. to 1100° C. in advance and then mixed.

8. The method for producing a sintered metal oxide for thermistors according to claim 6, further comprising the steps of:
    mixing the calcined powder with insulator material powder to thereby obtain a mixed calcined powder represented by the general formula: $(1-z)La_{1-y}A_y(Cr_{1-x}Mn_x)O_3 + zM$, with the proviso that A represents at least either one of Ca or Sr, and x, y and z satisfy $0.0 \leq x \leq 1.0$, $0.0 < y \leq 0.7$, and $0.0 \leq z \leq 0.8$, and M represents the insulator material;
    molding and sintering the mixed calcined powder to thereby obtain a sintered body.

9. The method for producing a sintered metal oxide for thermistors according to claim 8, wherein at least one of the insulator materials is $ZrO_2$, the method further comprising the step of:
    subjecting a heat treatment to the mixed sintered body at a temperature of 900° C. or higher.

10. The method for producing a sintered metal oxide for thermistors according to claim 8, wherein at least one of the insulator materials is $ZrO_2$ and the calcined powder is further mixed with a zirconia stabilizing material.

11. The method for producing a sintered metal oxide for thermistors according to claim 10, wherein the zirconia stabilizing material is mixed in proportion such that the sintered body is represented by the general formula: $(1-z)La_{1-y}A_y(Cr_{1-x}Mn_x)O_3+z((1-w)ZrO_2+wM)$, with the proviso that A represents at least either one of Ca or Sr, and x, y, z and w satisfy $0.0 \leq x \leq 1.0$, $0.0 < y \leq 0.7$, $0.0 < z \leq 0.8$, and $0.0 < w \leq 0.2$, and M represents the zirconia stabilizing material.

12. The method for producing a sintered metal oxide for thermistors according to claim 6, wherein in the sintering step, at least either one of $CaCO_3$ or $SrCO_3$ is added as a sintering aid to the calcined powder or a mixture containing the calcined powder.

13. A sintered metal oxide for thermistors having a negative temperature coefficient, comprising:
a complex oxide represented by the general formula: $(La_{1-y}Y_y)_{1-z}A_z(Cr_{1-x}Mn_x)O_3$, with the proviso that A represents at least either one of Ca or Sr, and x, y, and z satisfy $0.0 \leq x \leq 1.0$, $0.0 < y < 1.0$, and $0.0 < z \leq 0.7$.

14. The sintered metal oxide for thermistors according to claim 13, wherein an insulator material is added to the complex oxide.

15. The sintered metal oxide for thermistors according to claim 13, comprising:
a complex oxide represented by the general formula: $1-w(La_{1-y}Y_y)_{1-z}A_z(Cr_{1-x}Mn_x)O_3+wY_2O_3$,
with the proviso that A represents at least either one of Ca or Sr, and x, y, z and w satisfy $0.0 \leq x \leq 1.0$, $0.0 < y < 1.0$, $0.0 < z \leq 0.7$, and $0.0 < w \leq 0.8$.

16. A thermistor element comprising:
the sintered metal oxide for thermistors according to claim 13; and
at least a pair of lead wires each having an end affixed to the sintered metal oxide for thermistors.

17. A thermistor temperature sensor comprising the thermistor element according to claim 16.

18. A method for producing a sintered metal oxide for thermistors having a negative temperature coefficient, the method comprising the steps of:
mixing and sintering a mixture comprising powders of $La_2O_3$, $Y_2O_3$, $ACO_3$, $Cr_2O_3$, and $MnO_2$ to thereby obtain a calcined powder of a complex oxide represented by the general formula: $(La_{1-y}Y_y)_{1-z}A_z(Cr_{1-x}Mn_x)O_3$, with the proviso that A represents at least either one of Ca or Sr, and x, y and z satisfy $0.0 \leq x \leq 1.0$, $0.0 \leq y \leq 1.0$, and $0.0 < z \leq 0.7$; and
molding and sintering the calcined powder.

19. The method for producing a sintered metal oxide for thermistors according to claim 18, wherein the $La_2O_3$ is subject to heat treatment at a temperature of 600° C. to 1100° C. in advance and then mixed.

20. The method for producing a sintered metal oxide for thermistors according to claim 18, further comprising the step of:
mixing the calcined powder with the powder of $Y_2O_3$ to thereby obtain a mixture containing a calcined powder represented by the general formula: $1-w(La_{1-y}Y_y)_{1-z}A_z(Cr_{1-x}Mn_x)O_3+wY_2O_3$, with the proviso that A represents at least either one of Ca or Sr, and x, y, z and w satisfy $0.0 \leq x \leq 1.0$, $0.0 < y < 1.0$, $0.0 < z \leq 0.7$, and $0.0 < w \leq 0.8$,
wherein the sintering step comprises molding and sintering the mixture.

21. The method for producing a sintered metal oxide for thermistors according to claim 18, wherein in the sintering step, at least either one of $CaCO_3$ or $SrCO_3$ is added as a sintering aid to the calcined powder or a mixture containing the calcined powder.

* * * * *